(12) United States Patent
Arnaldo et al.

(10) Patent No.: US 10,367,841 B2
(45) Date of Patent: Jul. 30, 2019

(54) METHOD AND SYSTEM FOR LEARNING REPRESENTATIONS FOR LOG DATA IN CYBERSECURITY

(71) Applicant: Patternex, Inc., San Jose, CA (US)

(72) Inventors: Ignacio Arnaldo, San Jose, CA (US); Ankit Arun, San Jose, CA (US); Mei Lam, San Jose, CA (US); Costas Bassias, San Jose, CA (US)

( * ) Notice: Subject to any disclaimer, the term of this patent is extended or adjusted under 35 U.S.C. 154(b) by 0 days.

(21) Appl. No.: 15/821,231

(22) Filed: Nov. 22, 2017

(65) Prior Publication Data
US 2018/0176243 A1 Jun. 21, 2018

Related U.S. Application Data

(63) Continuation-in-part of application No. 15/382,413, filed on Dec. 16, 2016, now Pat. No. 9,904,893.
(Continued)

(51) Int. Cl.
*H04L 29/06* (2006.01)
*G06N 3/08* (2006.01)
*G06F 21/55* (2013.01)

(52) U.S. Cl.
CPC ........ *H04L 63/1425* (2013.01); *G06F 21/552* (2013.01); *G06N 3/08* (2013.01); *H04L 63/1416* (2013.01)

(58) Field of Classification Search
CPC .... H04L 63/1425; H04L 63/1416; G06N 3/08
See application file for complete search history.

(56) References Cited

U.S. PATENT DOCUMENTS

| | | | | |
|---|---|---|---|---|
| 8,463,721 B2* | 6/2013 | Prokhorov | ......... | G06K 9/00845 706/20 |
| 8,682,812 B1* | 3/2014 | Ranjan | ............... | H04L 63/1425 706/12 |

(Continued)

OTHER PUBLICATIONS

Arnaldo, Arun, Lam, and Bassias; Learning Representations for Log Data in Cybersecurity; 1 PatternEx Inc, San Jose, CA, USA and 2 Universidad Rey Juan Carlos, Madrid, Spain; http://dai.lids.mit.edu (Year: 2017).*

(Continued)

*Primary Examiner* — Mahfuzur Rahman
*Assistant Examiner* — Richard W Cruz-Franqui
(74) *Attorney, Agent, or Firm* — Hulsey PC

(57) ABSTRACT

Disclosed is a data analysis and cybersecurity method, which forms a time-based series of behavioral features, and analyzes the series of behavioral features for attack detection, new features derivation, and/or features evaluation. Analyzing the time based series of behavioral features may comprise using a Feed-Forward Neural Networks (FFNN) method, a Convolutional Neural Networks (CNN) method, a Recurrent Neural Networks (RNN) method, a Long Short-Term Memories (LSTMs) method, a principal Component Analysis (PCA) method, a Random Forest pipeline method, and/or an autoencoder method. In one embodiment, the behavioral features of the time-based series of behavioral features comprise human engineered features, and/or machined learned features, wherein the method may be used to learn new features from historic features.

17 Claims, 9 Drawing Sheets

Related U.S. Application Data

(60) Provisional application No. 62/485,293, filed on Apr. 13, 2017.

(56) References Cited

U.S. PATENT DOCUMENTS

| | | | |
|---|---|---|---|
| 9,049,173 B2* | 6/2015 | Yin | H04L 63/0281 |
| 9,608,961 B2* | 3/2017 | Yin | H04L 63/0236 |
| 9,705,904 B1* | 7/2017 | Davis | G06F 21/562 |
| 2017/0104773 A1* | 4/2017 | Flacher | H04L 63/1458 |
| 2018/0101742 A1* | 4/2018 | Burge | G06K 9/00926 |
| 2018/0103056 A1* | 4/2018 | Kohout | H04L 41/0686 |
| 2018/0115568 A1* | 4/2018 | Du | G06N 3/088 |
| 2018/0159877 A1* | 6/2018 | Holzhauer | H04L 43/10 |
| 2018/0159879 A1* | 6/2018 | Mestha | H04L 63/1425 |
| 2018/0167404 A1* | 6/2018 | Machlica | H04L 63/1425 |
| 2018/0176243 A1* | 6/2018 | Arnaldo | G06F 21/552 |

OTHER PUBLICATIONS

Arnaldo, Arun, Lam, and Bassias; Learning Representations for Log Data in Cybersecurity; 1 PatternEx Inc, San Jose, CA, USA and 2 Universidad Rey Juan Carlos, Madrid, Spain; http://dai.lids.mit.edu.

* cited by examiner

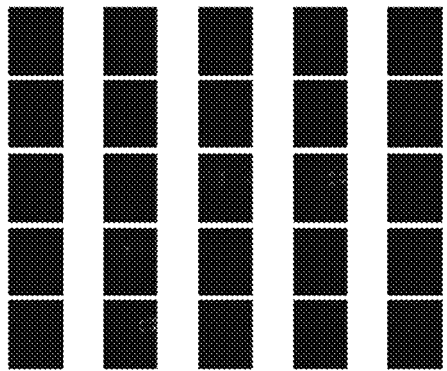 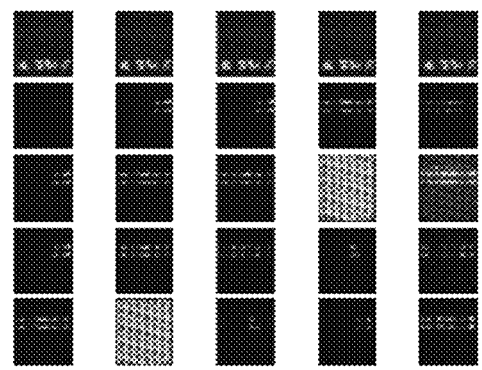
FIG. 2A  FIG. 2B
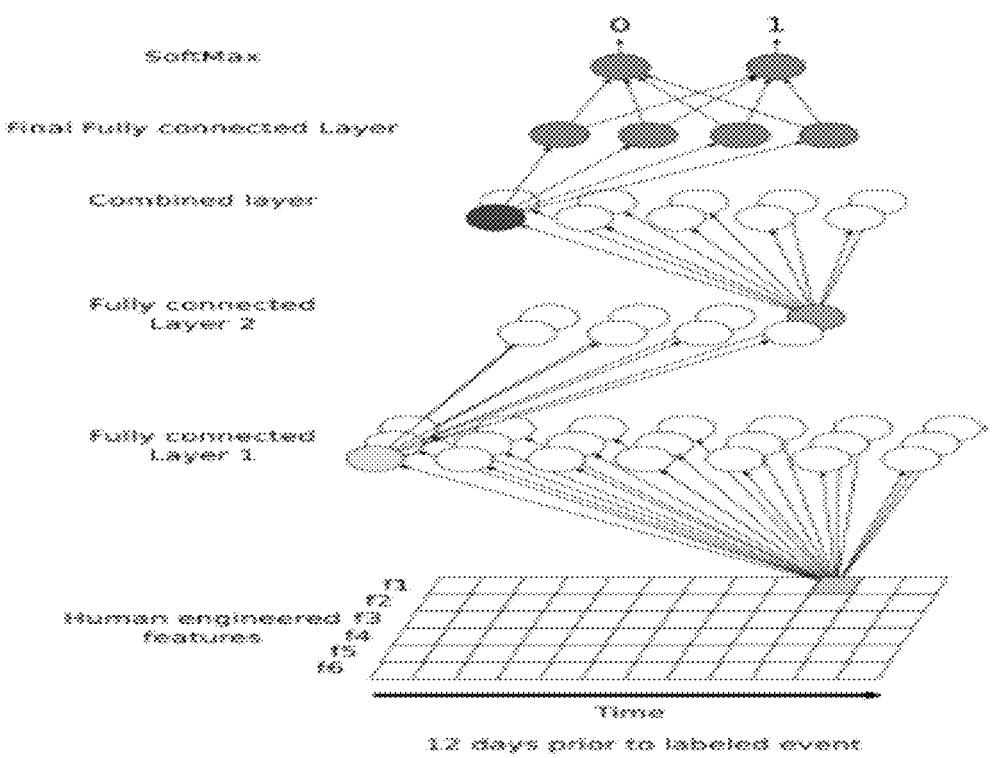
FIG. 3A

METHOD AND SYSTEM FOR LEARNING REPRESENTATIONS FOR LOG DATA IN CYBERSECURITY

CROSS-REFERENCE TO RELATED APPLICATIONS

This application claims benefit to Provisional Application No. 62/485,293 filed Apr. 13, 2017, and is a continuation-in-part of U.S. Ser. No. 15/382,413, all of which are incorporated herein by reference.

FIELD OF THE DISCLOSURE

The present disclosure relates generally to security analyst driven and machine learning driven cyber security systems; and more particularly to feature discovery methods for cyber security systems.

BACKGROUND OF THE DISCLOSURE

Electronic information across networks is a crucial aspect of enterprise or e-commerce systems. However, malicious or unauthorized use of these systems is on the rise, as evidenced by daily reports of breach and fraud, despite implementation of existing security systems.

Advanced persistent threats (APTs) which may target the exfiltration of critical data, typically comprise a series of steps including: infection, exploitation, command and control, lateral movement, and data exfiltration. The command and control phase, in which an attacker maintains a communication channel between an infected host inside the targeted organization and a remote server controlled by the attacker, may span weeks or months. However, despite its long duration, its detection in real-world organizations remains a great challenge. In fact, to further frustrate detection efforts, some attackers may not only minimize their footprint by combining active with stealthy phases, but also establish communication channels via unblocked services and protocols, therefore blending in with legitimate traffic. Since most organizations allow their employees to freely browse the Internet, web traffic is a very effective channel for attackers to communicate and maintain control over infected machines.

Descriptive studies show that, when analyzed over a period of several weeks, web-based command and control traffic patterns exhibit distinctive network profiles, with the frequency and network profile being dependent on the specific threat, or malware family involved in the attack. For example, infected machines may periodically attempt to communicate with the remote server(s), and may generally establish lightweight connections in which they receive new instructions. In a minor fraction of these connections, the infected machine will download a larger amount of data, corresponding to a software update.

However, most machine learning-based attempts to detect command and control focus on the analysis of individual connections. Given the large volume of data generated today at most organizations' perimeters and the number of entities that need to be monitored and analyzed, it is a great challenge to train models with behavioral patterns observed over weeks of data. In fact, depending on the organization size and activity, perimeter devices such as next generation firewalls may typically generate up to 1 TB of log data and involve tens of millions of entities on a daily basis.

As such, there is a need for improved cyber security system, and particular for security systems capable of handling large volumes of data, and detecting threat patterns exhibited over extended periods of time.

BRIEF SUMMARY OF THE DISCLOSURE

The present disclosure details a framework for exploring and learning representations of log data. The log data may be generated by enterprise-grade security devices for detecting advanced persistent threats (APTs). The disclosed framework combines behavioral analytics, time series formatting, and representation learning algorithms to model and analyze large volumes of data. Approaching modeling problems from a time series perspective enables modeling large periods of time while preserving granular information, based on the use of short time segments. Thus, a "divide-and-conquer" strategy is employed for data modeling, as feature extraction requires access to a single day of log data at a time; thus reducing computational and log storage requirements.

The present disclosure employs human-engineered behavioral features in addition to representation learning algorithms, and further discloses a series of representation learning algorithms to complement human-engineered features in a variety of classification approaches, according to alternate embodiments of the disclosure.

Thus, the disclosure provides a method of analyzing raw log data through high-level abstractions that may detect attacks spanning over several weeks in real-world organizations. This may include, for example, a command and control phase of an attack targeting data exfiltration, which may be detected at the enterprise network perimeter.

The disclosed approach was tested and validated with a dataset extracted from 3 billion log lines generated at an enterprise network perimeter with reported command and control communications, wherein results showed an area under the ROC curve of 0.943 and 95 true positives out of the Top 100 ranked instances on the test data set.

According to various embodiments, the present disclosure provides a cybersecurity method comprising: forming a time based series of behavioral features by extracting at least one behavioral feature from a first set of log data retrieved over a first time segment, and extracting at least one behavioral feature from a second set of log data retrieved over a second time segment; and analyzing the time based series of behavioral features for attack detection, new features derivation, features evaluation, or a combination thereof, wherein said analyzing the time based series of behavioral features comprises using a neural network based system, a dimensionality reduction system, random forest system, or combinations thereof. In one embodiment, the behavioral features of the time-based series of behavioral features comprise human engineered features, machined learned features, or a combination thereof. In a further embodiment, each of the at least one behavioral features is a human engineered feature, and analyzing the time based series of features is used to derive new features. In a further embodiment, each of the at least one the behavioral feature is extracted by activity tracking, activity aggregation, or a combination thereof. In yet a further embodiment, forming a time based series of behavioral features further comprises retrieving log lines belonging to at least one log line parameter. In another embodiment, each of the at least one behavioral feature is associated with a unique entity. In a further embodiment, the time-based series of behavioral features is formatted into a time-based matrix, wherein each behavioral feature is associated with an entity and a time segment. In yet a further embodiment, the time based series of behavioral features comprises a multivariate time series dataset, $D \in \mathbb{R}^{n \times d \times p}$, where n is the number of entities, d is the number time steps, and p is the number of features extracted per entity and time step. In another embodiment, analyzing the time based series of behavioral features comprises applying a first method, comprising at least FFNN, CNN, LSTM, PCA, RNN, in combination with a second method, comprising RF. In yet another embodiment, analyzing the time based series of behavioral features comprises applying a method based on a Feed-Forward Neural Network (FFNN), a Convolutional Neural Network (CNN), a Recurrent Neural Network (RNN), Long Short-Term Memory (LSTM) network, principal Component Analysis (PCA), a Random Forest pipeline, an autoencoder, or combinations thereof.

According to various embodiments, the present disclosure also provides an apparatus for learning representations of log data for cyber security, the apparatus comprising: one or more processors; a system memory coupled to the one or more processors; one or more non-transitory memory units coupled to the one or more processors; and features extraction codes, features formatting codes, and data analysis codes stored on the one or more non transitory memory units, that when executed by the one or more processors, are configured to perform a method, comprising: forming a time based series of behavioral features by extracting at least one behavioral feature from a first set of log data retrieved over a first time segment, and extracting at least one behavioral feature from a second set of log data retrieved over a second time segment; and analyzing the time based series of behavioral features for attack detection, new features derivation, features evaluation, or a combination thereof, wherein said analyzing the time based series of behavioral features comprises using a neural network based system, a dimensionality reduction system, random forest system, or combinations thereof.

In one embodiment, the behavioral features of the time-based series of behavioral features comprise human engineered features, machined learned features, or a combination thereof. In a further embodiment, the features extraction codes are configured to extract each of the at least one behavioral feature by executing an activity tracking module, an activity aggregation module, or a combination thereof. In yet a further embodiment, the method further comprises feeding data comprising log lines into the apparatus through a network interface to the one or more non-transitory memory units.

In a further embodiment, each of the at least one behavioral feature is associated with a unique entity. In yet a further embodiment, the time based series of behavioral features comprises a time-based matrix. In another embodiment, the apparatus further comprises a feature formatting module, the feature formatting module comprising a code stored on the one or more non-transitory memory units that, when executed by the one or more processors, is configured generate a time based features matrix by formatting and storing the at least one or more features into the time based features matrix, wherein each feature is associated an entity and time segment.

In a further embodiment, the data analysis codes are configured to analyze the time based series of behavioral features by a Feed-Forward Neural Network (FFNN), a Convolutional Neural Network (CNN), a Recurrent Neural Network (RNN), Long Short-Term Memory (LSTM) network, principal Component Analysis (PCA), a Random Forest pipeline, an autoencoder, or combinations thereof.

According to various embodiments, the present disclosure further provides a cybersecurity method comprising: retrieving log lines belonging to one or more log line parameters from one or more enterprise system data sources and from incoming data traffic to the enterprise system; computing one or more features from the log lines by activity tracking, activity aggregation, or a combination thereof; and storing the one or more features in a behavioral features matrix. In one embodiment, the behavioral features matrix comprises features computed at different time segments. In another embodiment, the one or more features comprise human engineered features, machined learned features, or a combination thereof. In yet another embodiment, the method further comprises performing an analysis based on the behavioral features matrix, wherein the analysis is for attack detection, feature evaluation, feature extraction, or combinations thereof.

In a further embodiment, activity aggregation for computing behavioral features over an interval of time comprises retrieving all activity records that fall within the given interval, and aggregating short interval activity records. In another embodiment, the behavioral features matrix is configured to store features computed over at least 3 days.

Numerous additional embodiments are also possible.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein:

FIGS. 2A and 2B provide a visual representation depicting behavioral images for "normal" and "malicious" entities, respectively, over a 28 day cycle, according to various embodiments;

FIGS. 3A, 3B, and 3C show, respectively (a) FFNN-based, (b) CNN-based, and (c) LSTM-based time series classification methods, which may be used with the log data analysis method of FIG. 1, according to various embodiments (for clarity, not all connections are shown in the FIGUREs);

Figure 1:
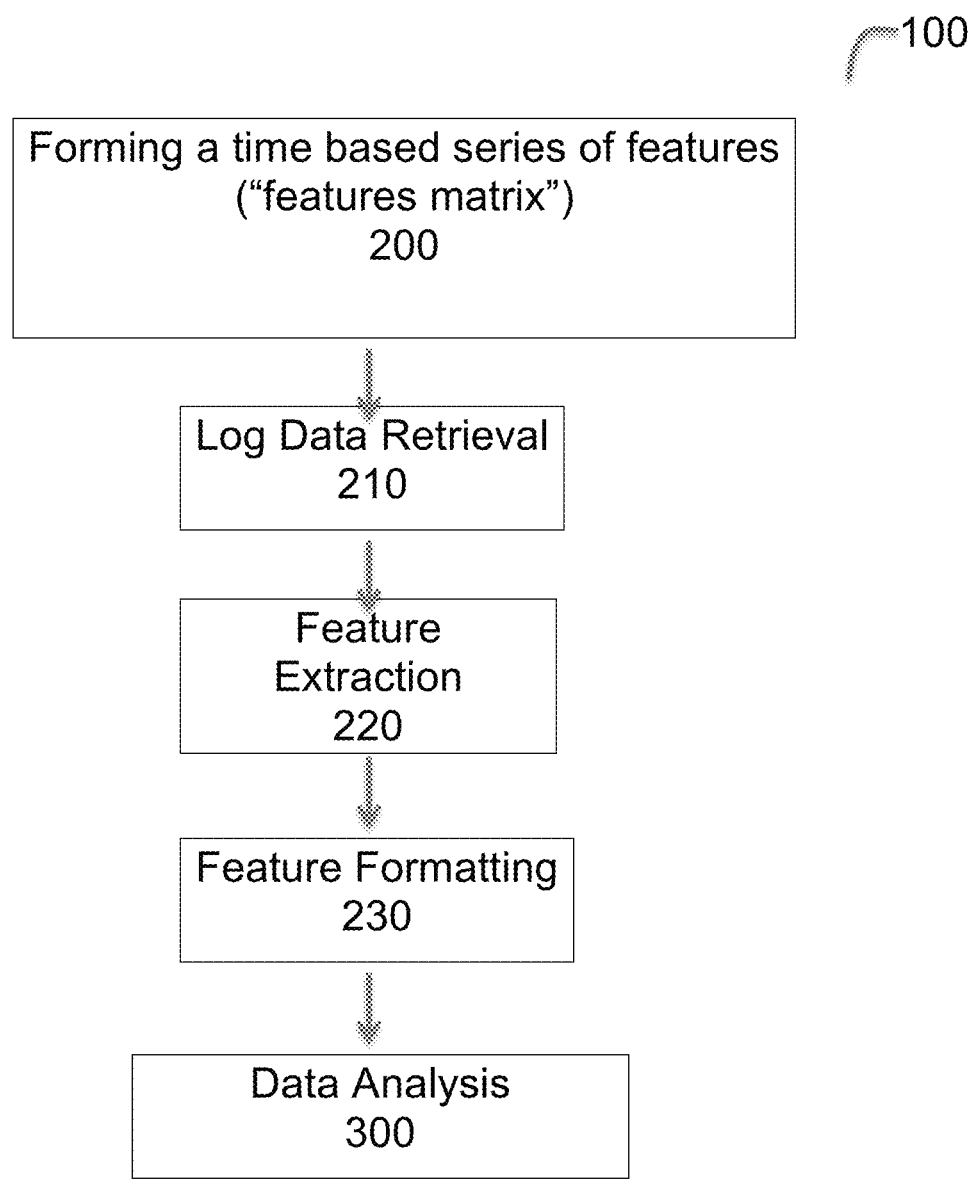
FIG. 1 is a block diagram illustrating a log data analysis method, according to various embodiments.

While the disclosure is subject to various modifications and alternative forms, specific embodiments thereof are shown by way of example in the drawings and the accompanying detailed description. It should be understood, however, that the drawings and detailed description are not intended to limit the disclosure to the particular embodiments. This disclosure is instead intended to cover all modifications, equivalents, and alternatives falling within the scope of the present disclosure as defined by the appended claims.

DETAILED DESCRIPTION

One or more embodiments of the disclosure are described below. It should be noted that these and any other embodiments are exemplary and are intended to be illustrative of the disclosure rather than limiting. While the disclosure is widely applicable to different types of systems, it is impossible to include all of the possible embodiments and contexts of the disclosure in this disclosure. Upon reading this disclosure, many alternative embodiments of the present disclosure will be apparent to persons of ordinary skill in the art.

Although the cybersecurity method and system here disclosed have been described in detail herein with reference to the illustrative embodiments, it should be understood that the description is by way of example only and is not to be construed in a limiting sense. It is to be further understood, therefore, that numerous changes in the details of the embodiments of this disclosed process and additional embodiments of this method and system will be apparent to, and may be made by, persons of ordinary skill in the art having reference to this description. It is contemplated that all such changes and additional embodiments are within the spirit and true scope of this disclosed method and system as claimed below.

The present disclosure introduces a framework for exploring and learning representations of log data generated by enterprise-grade security devices with the goal of detecting advanced persistent threats (APTs). The presented framework uses a divide-and-conquer strategy combining behavioral analytics, time series modeling and representation learning algorithms to model large volumes of data.

The disclosed subject matter provides a method for detection of threats, which may be at the enterprise network perimeter, by analyzing raw log data with high level abstractions to detect attacks that may span over several weeks in real-world organizations.

APTs generally target the exfiltration of critical data, and are modeled as series of steps including: infection, exploitation, command and control, lateral movement, and data exfiltration. Thus, the present disclosure may be particularly suited for detection of a command and control phase of an attack at the enterprise network perimeter. In various embodiments, human-engineered features may be complemented by representation learning algorithms in various classification approaches.

Embodiments of the present disclosure may process web logs, firewall logs, or a combination of the two. In a typical enterprise or e-commerce system, logs may be delivered in real, streaming time from widely distributed sources.

Typically, but not exclusively, web log analysis may facilitate the detection of web attacks. Typically, but not exclusively, mining firewall logs may facilitate the prevention of data ex-filtration in the enterprise or e-commerce setups.

FIG. 1 details a block diagram illustrating an exemplary log data analysis method 100, in accordance with various embodiments. The method 100 may be a cyber security method, and may be used for detection of APTs, according to various embodiments. The method 100 may comprise a process step 200 of forming a time based series of features ("features matrix") by extracting at least one behavioral feature from a first set of log data retrieved over a first time segment, and extracting at least one behavioral feature from a second set of log data retrieved over a second time segment. The method 100 may further comprise performing data analysis 300 on the features data set obtained in step 200. This may include performing a time series analysis on the data set, which may be based on various time series analysis including classification techniques. Such techniques may include various neural network based systems, dimensionality reduction systems, dimensionality reduction systems, and combinations thereof. In embodiments, analysis of the data set may be used to detect possible threats, evaluate the usefulness of existing or historic features, and/or learn new features useful for future analysis.

Forming a Time-Based Series of Features

As shown in FIG. 1, processing begins at step 200, whereupon a time-based series of features is formed by extracting features from multiple time segments. Each extracted feature may be associated with a unique entity. Thus, features may be extracted on a per-entity and per-time-interval basis, and formatted into a time-based series of features. In embodiments, step 200 may comprise: log data retrieval 210, and feature extraction 220, which may be repeated for over multiple time segments. Step 200 may further comprise features formatting 230, wherein features extracted over multiple time segments are formatted into a time-based series of features. In embodiments, newly extracted features may be added to an existing features dataset, or existing features may be deleted from the set.

Log Data Retrieval

In embodiments, log data retrieval 210 may comprise retrieving log lines belonging to one or more log line parameters from one or more enterprise or e-commerce system data source and/or from incoming data traffic to the enterprise or e-commerce system. The one or more enterprises or e-commerce system data sources may comprise at least one of: web server access logs, firewall logs, packet captures per application, active directory logs, DNS logs, forward proxy logs, external threat feeds, AV logs, user logon audits, DLP logs, LB logs, IPS/IDS logs, black listed URLs, black listed IP addresses, and black listed referrers. In some embodiments, next generation firewall logs are retrieved for detection of a command and control attack at a network perimeter. The one or more log line parameters may comprise, for example, user ID, session, IP address, and URL query.

Feature Extraction

Process flow continues with feature extraction 220, wherein at least one behavioral feature is computed from the retrieved log lines for at least one entity, per time segment.

Unique entities may be, for example, IP addresses, users, sessions, etc. These entities can be independent or connected. For example, the same IP addresses may be associated with two or more users. For each entity, a set of behavioral features may be generated on a per time-segment basis.

Computation of a behavioral feature involves describing, for each entity, at least one behavior with a quantitative value, also known as a variable, feature, or behavioral feature. According to various embodiments, these quantitative values may be specified by security experts, and may generally correspond to indicators an expert would use to investigate an attack (herein referred to as "human engineered features"). In further embodiments, features may be machine learned based on the analysis of previous features data, wherein the previous features data may comprise human engineered features and/or machine learned features. Thus, the disclosed method may use a time-based matrix of human engineered features and/or machine-learned features for new features derivation, features evaluation, and/or attack detection analysis. Additionally, each array of entities and features data (i.e. single time step data) may be independently analyzed for attack detection and features analysis.

In various embodiments, feature extraction 220 may comprise computations of behavioral features in real time. A system suitable for real-time behavioral analytics may comprise, for example, capabilities for analyzing the behavior of at least about 10 million entities on a daily basis. In various embodiments, such a system may have capabilities of updating and retrieving the behavioral signatures of active entities, on demand, and in real time, and may be capable of retrieving behavioral signature of up to about 50 thousand entities at once.

Big Data Processing Architecture for Feature Extraction

Feature extraction for high-volume, high velocity data, may require processing at a challenging scale. In the InfoSec domain, to calculate behavioral features for one entity over a particular time segment, one must isolate all relevant historic log lines and perform the aggregations that feature definition demands (e.g. aggregating the data sent by a particular host during the particular time segment). This process must be repeated for all the active hosts. Such computations may be challenging due to high volume, distributed storage of data, and the need to aggregate over historical data to compute the feature.

Described below is a Big data processing architecture, which may be used for managing such high-volume, high-velocity data, for feature extraction.

According to various embodiments, feature extraction may include activity tracking, activity aggregation, or a combination thereof. As disclosed herein, embodiments performing activity tracking may absorb log stream generated by the platform, identify the entities involved in each log line, e.g. IP address, user etc., and update the corresponding activity records. These activity records may then be calculated and stored according to system guidelines. In one guideline arrangement, activity records are calculated and stored in accordance with a short temporal window. For example, the temporal window over which these activity records may be computed and stored may be in one-minute increments. This way, the computation of behavioral features are computed for different time intervals, such as –30 minutes, 1 hour, 12 hours, and 24 hours, according to various embodiments. This allows flexibility in analysis.

In a further guideline arrangement, activity records may be calculated and stored for streamlined, efficient retrieval of the user data necessary for feature computation. Depending on the definition of the feature, aggregating activity records for a larger time window may include anything from simple counters to complex data structures. 

Examples of categories of behavior features, and their structure for efficient data retrieval and aggregation may include the following:

Example 1

Counts, averages, and standard deviations which can be derived from simple counters (e.g. the number of successful logins over the last 24 hours).

Example 2

Indicators (or Boolean variables): Aggregating indicators is also straightforward and requires no additional data structures (e.g. whether at least one address verification failed over the last 24 hours).

Example 3

Relational features which are calculated using data at the intersection of two entities (e.g. the maximum outlier score given to an IP address from which the user has accessed the website). To compute these features efficiently, graphs that represent relations between entities in the system may be used.

Example 4

Temporal behaviors which capture the time elapsed between two or more events, and therefore must be analyzed in chronological order (e.g. the minimum time from login to checkout). Computing these features may include time stamping all the relevant events (in this case, logins and checkouts), and comparing the time elapsed between consecutive events.

Example 5

Unique values: This kind of feature cannot be computed with counters, since duplicated values must be kept track of. A dictionary may be used to maintain a set of unique values of the feature, and update it every time new user activity is analyzed (e.g. the number of different locations from which a user has accessed the website over the last 24 hours).

In activity aggregation, computing behavioral features over an interval of time may require a first step of retrieving all activity records that fall within the given interval, such as, for example, behavioral descriptors aggregated over 24 hours, ending at the time of the last user activity, according to various embodiments. This may be graphically represented as a rolling 24-hour window for feature computation, according to various embodiments.

Computing behavioral features in activity aggregation may further require a second step of aggregating short interval (e.g. minute-by-minute) activity records as the feature demands, according to various embodiments. (This aggregation step depends on the feature type). In the simplest step, counters, for example, one must merely add all the minute-by-minute values together. The more complex case of unique values requires retrieving the unique values of a super set formed by the minute-to-minute sets.

While a short (e.g., 1 minute) temporal scope of an activity record allows for aggregation of records and computation of features for flexible time intervals, it may compromise performance by increasing the number of records for retrieval and aggregation. In order to improve performance, activity records may be maintained with different, overlapping time scopes. For example, records may be maintained on a minute-by-minute basis (starting on the dot); an hourly basis (starting on the dot); a daily basis (starting at midnight); and a weekly basis (starting Sunday at midnight), according to various embodiments. This way, if features need to be computed for long intervals, the record retrieval and aggregation requirements remain bounded and satisfy real-time requirements.

Feature Formatting

Following the per-entity and per-time-interval feature extraction 220, process flow continues with feature formatting 230. At step 230 the activity of recurrent entities may be captured at several time instants, stored, and formatted into a multivariate time-based series of features, or time series dataset $D \in \mathbb{R}^{n \times d \times p}$, where n is the number of entities, d is the number time steps (e.g. in days) used for modeling, and p is the number of features extracted per entity and time step.

According to various embodiments, the number of time steps, d, in a dataset may be at least 3, and more preferably at least 5, according to various embodiments. In some embodiments, d may be between 7 and 30. The duration of a time step may be, for example, less than an hour, several hours, days, a week, etc., according to various embodiments. In some embodiments, a time step may be 1 day. The dataset may be formatted based on activity obtained from consecutive time steps, which may be of equal time duration. However, depending on factors such as the specific application, operating parameters, volume of activity, computational capacity, type of inquiry, data analytics method, etc., the formatted dataset may not necessarily be limited to data obtained over consecutive or equal time segments, and time step duration, number of time steps, features, entities, etc., may vary.

FIGS. 2A and 2B provide a visual representation depicting behavioral images for "normal" and "malicious" entities over a consecutive 28 day cycle, according to various embodiments. As depicted, the activity or behavior of each entity can be represented as a "behavioral image." This representation presents a component of temporal locality: consecutive rows contain information about consecutive moments in time. This locality does not apply to consecutive columns, since adjacent features in the matrix can be independent.

Data Analysis

Once the data is formatted according to step 230, processing continues with data analysis 300. In this step, the formatted features data may be analyzed for feature extraction, feature evaluation, and/or threat detection. In embodiments, newly computed features may be combined with existing historic features. Thus, time series analysis, which may start with only human engineered features, may continuously refine and improve upon those original features, buy adding new features, deleting old features, and/or evaluating the usefulness of existing features.

In embodiments, an attack may be determined by a human analyst and/or machine according to various algorithms. Various attack/threat detection methods may be employed. Such methods may comprise, for example, statistical outlier detection methods, as described in U.S. application Ser. No. 15/382,413; and threat detection may be based on features data for one or more time segments, according to various embodiments.

Figure 3B:
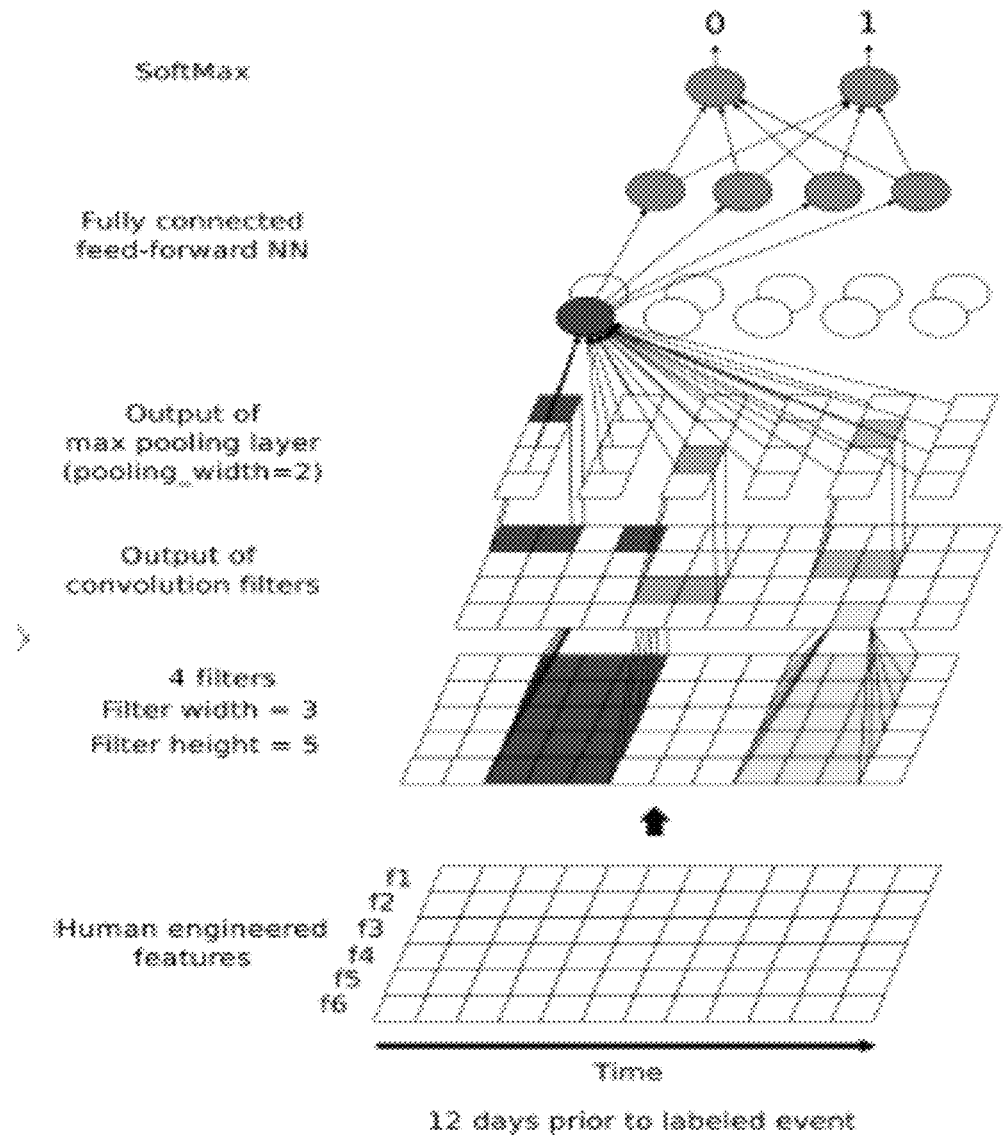

In embodiments, data analysis 300 may comprise the use of representation learning techniques, such as dimensionality reduction, random forest, and/or neural networks based methods for multivariate time series classification. Examples of various methods suitable for time series classification and feature extraction or feature learning, may include, but are not limited to: Feed-Forward Neural Networks (FFNN) as depicted in FIG. 3a; Convolutional Neural Networks (CNN), as depicted in FIG. 3b; Recurrent Neural Networks (RNN) with Long Short-Term Memories (LSTMs) as depicted in FIG. 2c; Principal Component Analysis (PCA) in combination with a Random Forest pipeline; an autoencoder in combination with a Random Forest pipeline; and various combinations of these methods. Additionally, while the present disclosure provides examples of various analytic techniques as described below, it should be understood that other data analysis techniques, which are, or may become available in the future, may be suitable for carrying out the disclosed method.

Feed-Forward Neural Networks

With particular reference to FIG. 3a, FFNNs are composed of one or more layers of nodes. The input layer consists of p×d neurons (one for each value in the input data), while the output layer is composed of m nodes, where m is the number of classes in the data. Intermediate layers are composed of an arbitrary number of nodes, with each layer fully connected to the next one. FIG. 3a shows a FFNN trained to classify multivariate time-series.

Convolutional Networks

Convolutional networks (CNNs or ConvNets), are FFNNs with special connection patterns (see FIG. 3B), and have been widely applied for image and video recognition. At the core of CNNs are convolutional filters or kernels. Intuitively, these filters are trained to identify patterns in reduced regions of the input data (small shapes in the case of images, or patterns in consecutive data points in the case of univariate time-series). CNNs are composed of an arbitrary number of such filters, therefore being capable of identifying a wide variety of low-level patterns in the data. (The same set of filters are applied across all the input data, and they generate, for each region of the input data where they are applied, an output value that indicates how similar the region of the input data and the filtered pattern are). The output of the convolutional layer is generally fed to a pooling layer, that is, to a layer that applies a local maximum operation. Intuitively, this operation provides robustness to determine whether a pattern exists in a region of the input data, independently of its exact location. The outputs of the last convolutional/pooling layers are fed to a fully connected feed-forward neural network. As for standard FFNNs, the final layer is composed of m nodes, where m is the number of classes in the data.

By stacking several layers of convolutional filters and pooling layers, CNNs can identify patterns involving larger regions of the input data. This is an example of a "deep" architecture, where lower layers learn to detect building blocks of the input data, while the last layers detect higher-level patterns. Typically, all the parameters (weights) in CNNs are learned during the training process. That is, the networks learns to identify the local patterns that ultimately help discriminate between data categories.

In the case of multivariate time-series data, CNNs can exploit locality to learn temporal patterns across one or more variables. (However, the relative position of features is generally arbitrary, as adjacent features are not necessarily related). Thus, in various embodiments, convolutional filters of width=1 may be used to learn patterns in each feature independently. Other embodiments may use filters of width=p, where p is the total number of input features, such that the network will learn filters or patterns involving all the features, according to alternate embodiments.

Long-Short Term Memories

Figure 3C:
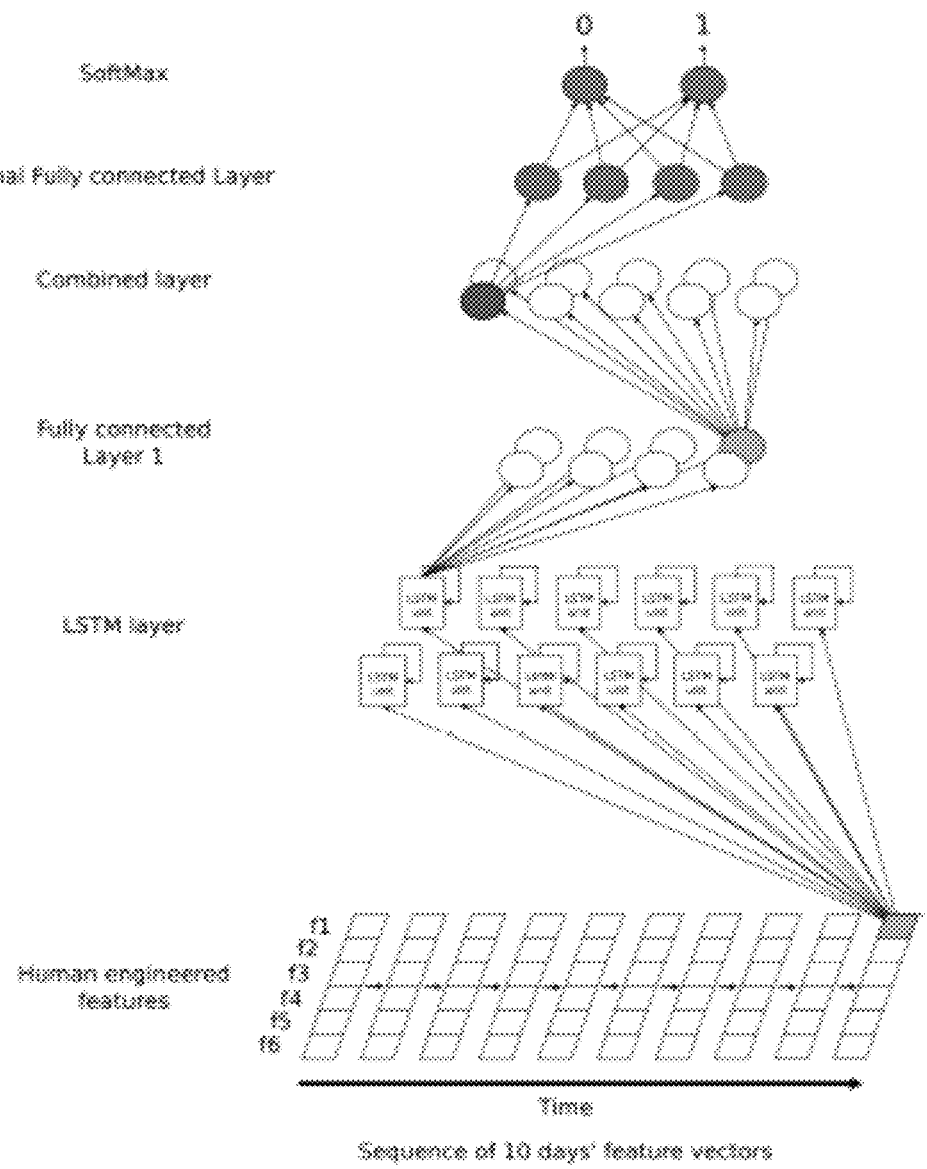

With reference to FIG. 3C, long short-term memory (LSTM) recurrent neural networks, are a special case of recurrent neural networks, which may be characterized by their use of LSTM cells. LSTM cells maintain a state, and generate an output given a new input and their current state. FIG. 3C shows a high-level representation of an LSTM architecture. As will be apparent to one skilled in the art, various types of LSTM cells may be suitable for use with the disclosed method. One such suitable LSTM variant may be as described in Sak, H., Senior, A. W., Beaufays, F.: *Long Short-Term Memory Based Recurrent Neural Network Architectures For Large Vocabulary Speech Recognition.* CoRR abs/1402.1128 (2014), which is expressly incorporated by reference herein. In embodiments, LSTM architectures may be preferred over recurrent neural networks and Hidden Markov Models to model time series with arbitrarily large time gaps between important events. With respect to FFNNs and CNNs, their main potential advantage is that inputs to LSTM architectures are sequences of arbitrary length, therefore enabling the training and reuse of a single model with time series of different lengths. These two characteristics of LSTMs are particularly relevant for information security analytics, where the goal is to detect attacks that are generally implemented in steps spread over time, and where modeled entities exhibit very different levels of activity, therefore generating time series of varying length.

PCA+Random Forest Pipeline

In embodiments, a combined PCA and Random Forest pipeline method may comprises flattening a dataset composed of n examples, p features, and d steps (e.g. in days), to obtain a feature matrix with n examples and p×d features. The dimensionality of the data may be reduced by projecting the data into the top principal components. The projected data may then be fed into a random forest classifier.

For example, Let X be a p-dimensional dataset. Its covariance matrix $\Sigma$ can be decomposed as: $\Sigma = P \times D \times P^T$, where P is an orthonormal matrix where the columns are the eigenvectors of $\Sigma$, and D is the diagonal matrix containing the corresponding eigenvalues $\lambda 1 \ldots \lambda p$. Graphically, an eigenvector can be seen as a line in 2 dimensional space, or a plane in higher-dimensionality spaces, while its corresponding eigenvalue indicates how much the data is stretched in that direction. At this stage, the columns of the eigenvector matrix P and eigenvalue matrix D may be sorted in order of decreasing eigenvalues. In other words, the eigenvectors and their corresponding eigenvalues are sorted in decreasing order of significance (the first eigenvector accounts for the most variance, the second for the second-most, etc.). The projection of the dataset into the principal component space is given by $Y=XP$. This projection may be performed with a reduced number of principal components, and is referred to as feature extraction. Let $Y^j$ be the projected dataset using the top j principal components: $Y^j = X_x P^j$. The projected data is then fed to a RandomForest classifier.

Autoencoder+Random Forest Pipeline

Autoencoders are multi-layer feed-forward neural networks, wherein input and output layers may have the same number of nodes, while intermediate layers may be composed of a reduced number of nodes, according to various embodiments. For example, autoencoders may be composed of three hidden layers, wherein the first and third hidden layers may count p/2 neurons, while the second, central layer is composed of p/4 neurons, where p is the dimensionality of the data. The tan-sigmoid transfer function may be used as an activation function across the network. The network may be trained to learn identity mapping from inputs to outputs. Thus, the mapping from inputs to intermediate layers compresses the data, effectively reducing its dimensionality, according to various embodiments. Once the network is trained, the data may be compressed by feeding the original data to the network, and retrieving the output generated at the central layer of the autoencoder, according to various embodiments. The output of the central layer of the autoencoder may then be fed to a random forest classifier, according to various embodiments.

Complementing Human-Engineered Features with Automatic Feature Discovery:

The disclosed method and system can complement human-engineered features with automatic feature discovery. In one embodiment, human engineered features may be separated from the historic data, wherein feature discovery may be applied only to the historic data. This may help determine whether feature discovery techniques are contributing to improve classification accuracy. The following present examples of such techniques, which are extensions of the above described time series classifiers.

According to an exemplary technique, $D^i = D^i_{hist} \cup D^i_{last}$ may represent the multivariate time series associated to entity i, and d may represent the number of time steps in the series. Accordingly, $D^1_{last}$ represents the feature vector corresponding to the last time step data and $D^i_{hist}$ is the multivariate time series composed of the previous (d−1) vectors. The time unit may be at 1 day, and d=28 time steps, for this example. A pipeline may be introduced where: deep learning methods learn a set of time series features from $D_{hist}$, and time series models may learn a reduced set of time series features from $D_{hist}$; the learned time-series features may be concatenated with $D_{last}$; and the combination of learned time series features and human-engineered features may be fed into a random forest classifier. This way, feature discovery techniques may effectively learn a set of time series features while the final predictions may be generated by interpretable models. By analyzing the grown decision trees, the relative importance of both the human engineered and automatically or machine discovered features may be determined. As described below, both unsupervised and supervised techniques may be used to discover new features from historic data.

Extension of Dimensionality Reduction Methods (PCA and RNN)

Figure 4A:
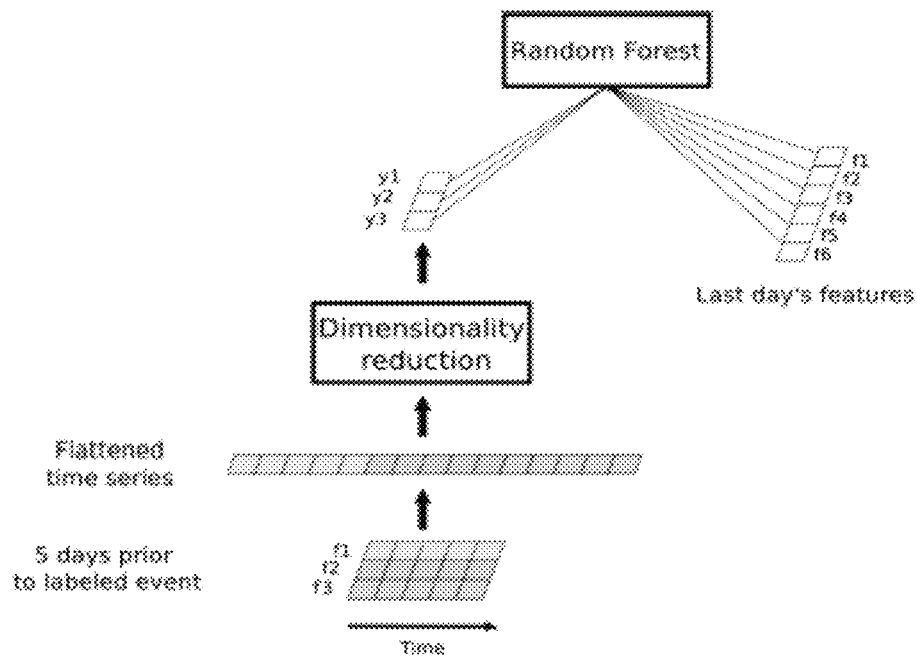
FIGS. 4A and 4B depict, respectively, dimensionality reduction and random forest pipeline diagrams of an FFNN-based model used as time-series feature generator transformations, according to various embodiments.

According to an embodiment, given a time series dataset $D=D_{hist} \cup D_{last}$, a dimensionality reduction technique may be applied to $D_{hist}$, where $D_{hist}$ represents historic feature values. The outputs of the dimensionality reduction method may be combined with the last time step's feature vector and fed into a random forest (RF) as depicted in FIG. 4A. Then a dimensionality reduction technique, such as a PCA and random forest ("PCA+RF extension method") and RNN or autoencoders ("RNN+RF extension method") may be used.

Extension of Supervised Deep Learning Methods (FFNN, CNN, and LSTM)

Figure 4B:
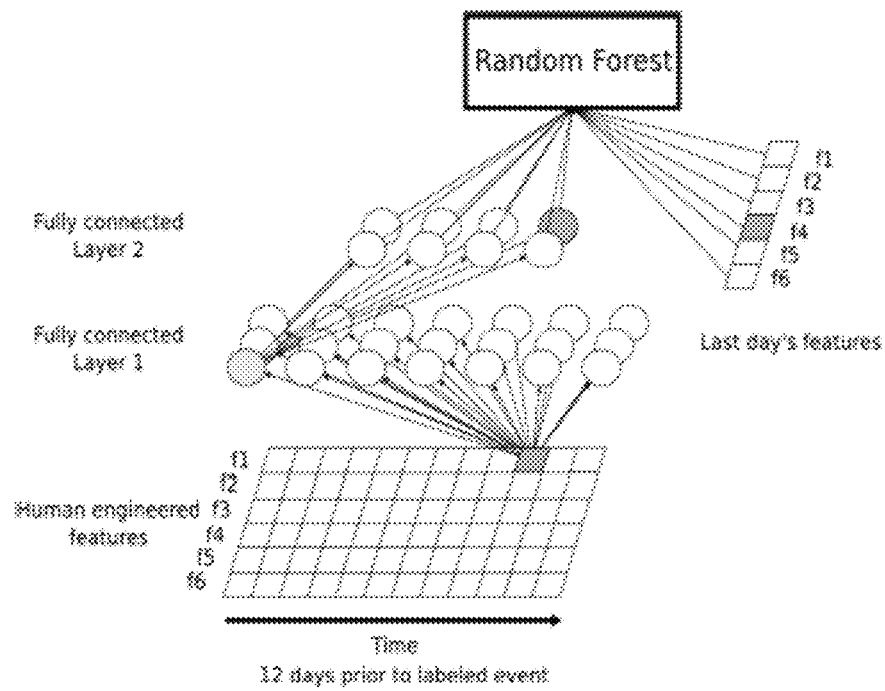
Figure 5A:
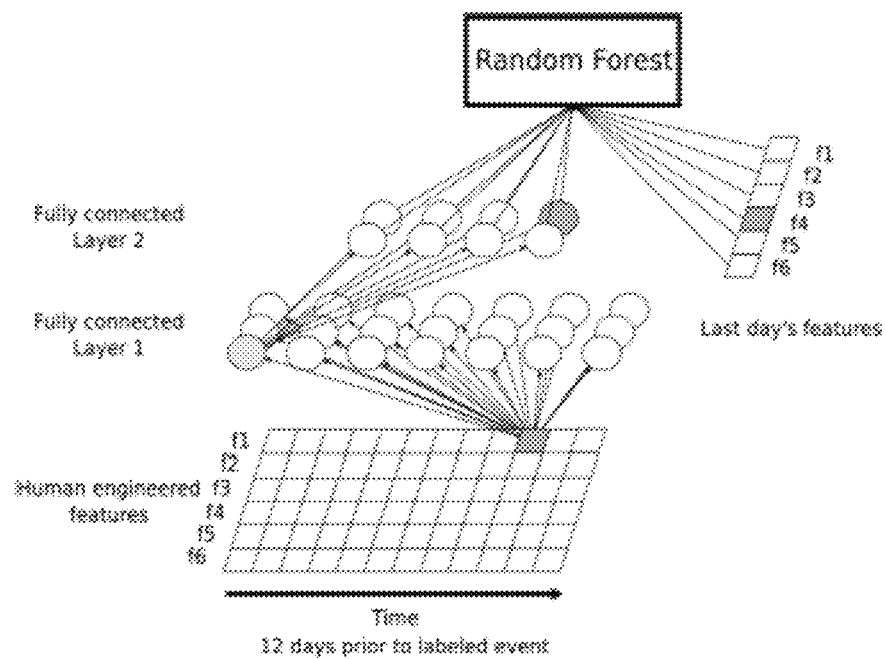
FIGS. 5A, 5B, and 5C show, respectively, (a) FFNN-based, (b) CNN-based, and (c) LSTM-based models designed to learn time series features, according to various embodiments.

FIGS. 5A, B, and C, respectively depict (a) FFNN-based, (b) CNN-based, and (c) LSTM-based models designed to learn time series features. According to various embodiments, these models present a structure that enables complementing a set of existing features with new features learned from historic data. The designed models may have two separate inputs: $D_{hist}$ and $D_{last}$. While $D_{hist}$ undergoes a series of nonlinear transformations in the left layers of the network, $D_{last}$ is directly connected to the last layers of the network. According to this design, the network is forced to learn features from $D_{hist}$ that are complementary to $D_{last}$. Once trained, these models can be used as standalone models for prediction on unseen data, and as "feature generators" used to extract features for unseen data, which may then be fed into a random forest classifier, (see FIG. 4B).

Figure 5B:
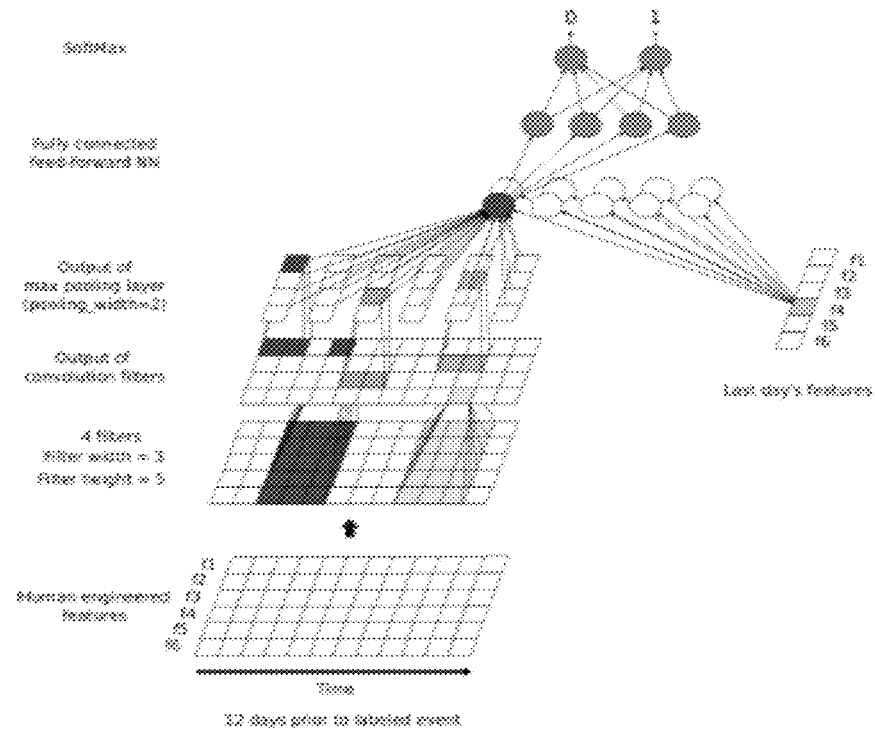
Figure 5C:
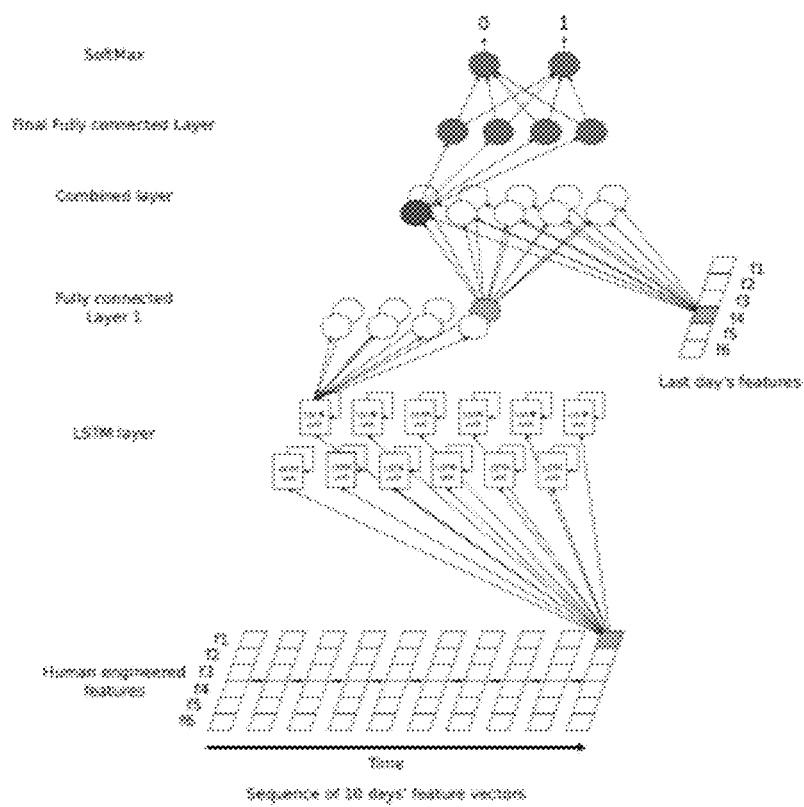

In embodiments, a model training and deployment system using these "feature generators" may include a training system comprising: training the models (i.e. shown in FIGS. 5A-C) via backpropagation using the dataset D; once the model is trained, propagating D through the network and retrieving the outputs generated at the last layer of the left section (the output $D_{ts}$ will be a matrix of shape n×q, where n is the number of examples and q is the number of learned features); concatenating $D_{last}$ and $D_{ts}$ to obtain $D_{conc}$, which is a new dataset with the shape n×(p+q), where p is the number of human engineered features; and training a decision tree classifier with $D_{conc}$.

The model training and deployment system may further include a prediction system for predicting on unseen data D', comprising: propagating D through the network and retrieving the outputs generated at the last layer of the left section of the network (as in the training system, the output $D'_{ts}$ may be a matrix of shape n×q); concatenating $D'_{last}$ and $D'_{ts}$ to obtain $D'_{conc}$; and feeding $D'_{conc}$ to the trained random forest and generating predictions. Thus, methods FFNN, CNN, and LSTM may be augmented into extension methods "FFNN+ RF ext", "CNN+RF ext", and "LSTM+RF ext."

Figure 7:
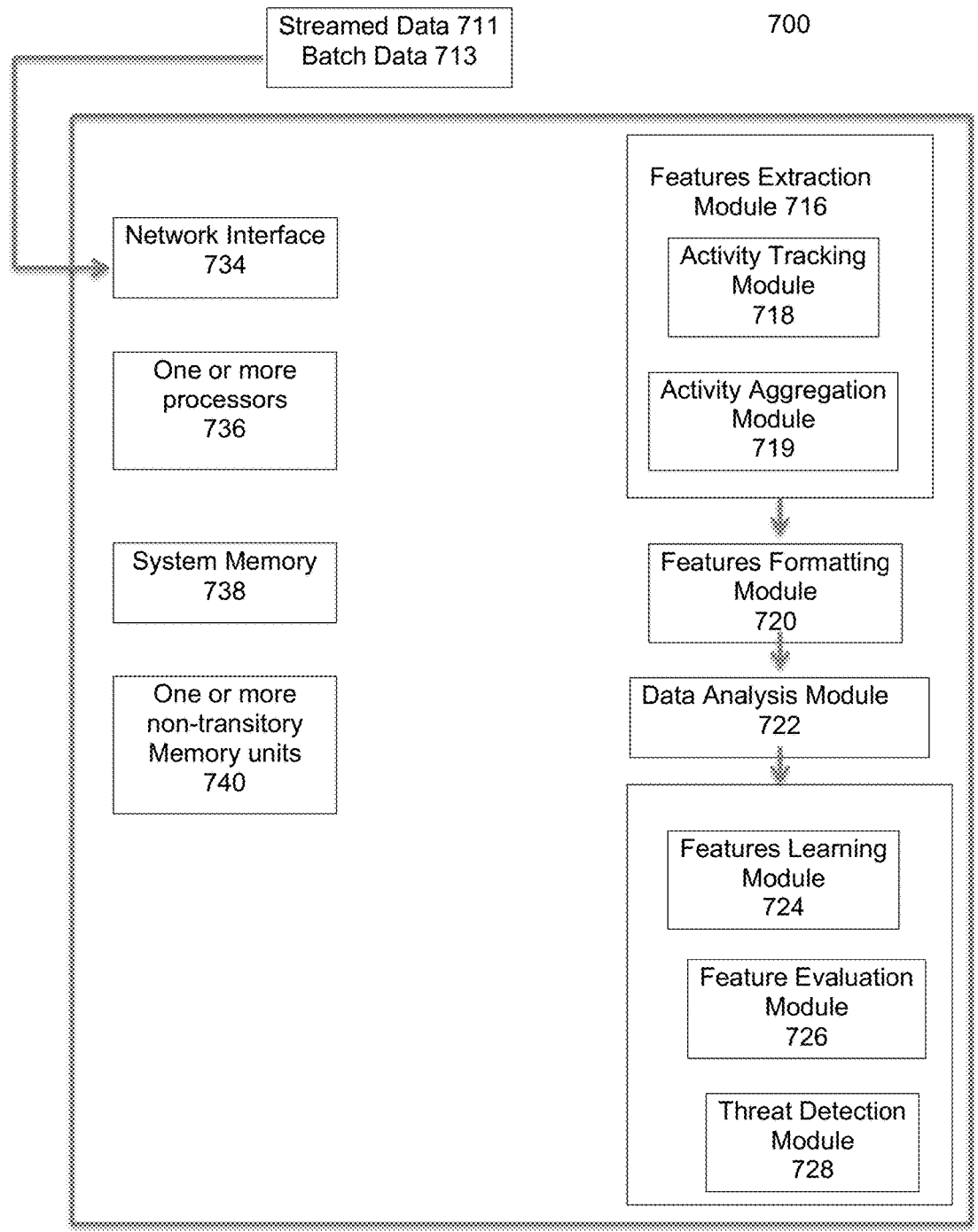
FIG. 7 depicts a block diagram illustrating an apparatus for carrying out the method of FIG. 1, in accordance with various embodiments.

FIG. 7 details a block diagram illustrating an exemplary apparatus 700 configured for identifying and detecting threats to an enterprise or e-commerce system, in accordance with various embodiments. In some embodiments, apparatus 700 comprises one or more processors 736, system memory 738, and one or more non-transitory memory units 740, all of which may be directly or indirectly coupled to and/or in communication with each other.

Streamed data 711, batch data 713, or a combination thereof, may be fed into the apparatus 700 through a network interface 734 to a features extraction module 716 which comprises code stored on the one or more non-transitory memory units that when executed by the one or more processors are configured to parse the streamed data 711, batch data 713, or a combination thereof, by grouping or bunching log lines belonging to one or more log line parameters and then computing one or more features from the grouped log lines.

Some embodiments may compute the one or more features by executing an activity tracking module 718, an activity aggregation module 719, or a combination thereof. An exemplary activity-tracking module may, as the system absorbs the log stream generated by the platform, identify the entities involved in each log line, e.g. IP address, user etc., and update the corresponding activity records.

Streamed data 711 may comprise incoming traffic to an enterprise or e-commerce system. Batch data 713 may comprise web server access logs, firewall logs, packet capture per application, active directory logs, DNS logs, forward proxy logs, external threat feeds, AV logs, user logon audits, DLP logs, LB logs, IPS/IDS logs, black listed URLs, black listed IP addresses, black listed referrers, and combinations thereof. The one or more log line parameters may comprise at least one of: user ID, session, IP address, and URL query. The one or more features may be stored for formatting into a time based series of features by a feature formatting module 720 where the feature formatting module 720 comprises codes stored on the one or more non-transitory memory units that, when executed by the one or more processors, are configured generate a time based features matrix and/or to format and store the at least one or more features into the time based features matrix. The features matrix may be a multivariate time series dataset, $D \in R^{n \times d \times p}$, where n is the number of entities, d is the number time steps, and p is the number of features extracted per entity and time step.

The features matrix is then sent to a data analysis module 722, which comprises code stored on the one or more non-transitory memory units that when executed by the one or more processors are configured to analyze the formatted features data for feature extraction, feature evaluation, and/or threat detection. In some embodiments, the data analysis module 722 may employ an analysis system which is a neural network system, a dimensionality reduction system, and/or a random forest system, or combinations thereof. In embodiments, the data analysis module may use one or more analysis methods, which may be FFNN, CNN, RNN, LSTM, PCA, Random Forest pipeline, or autoencoder methods, or combinations thereof. In some embodiments, the data analysis module may derive new features via a features learning module 724, evaluate historic features (which may be human engineered or machine derived) via a features evaluation module 726, and/or detect a security threat via a threat detection module 728.

Example for Command and Control Detection

In an example demonstrating command and control detection, data generated at the enterprise network perimeter comprising two months worth of logs generated by an enterprise next generation firewall was considered. These files register approximately 50 million log lines and 150K active entities daily, summing to total of 3 billion log lines and 12 million analyzed entities. One percent of the entities was sampled, preserving all the attack examples, which resulted in a dataset composed of 89K examples.

A multivariate time series where the time step is a day, the length of the series is d=28 days, and the activity at each time step is described with 32 features was considered. The dataset generated was an 89K×28×32 array, (i.e. examples× time steps×features). The data pertaining to the first month (53K entities) was used to train the models, while the second month (36K entities) was used as testing set. It is worth noting that, although the present disclosure analyzes a subsampled dataset, malicious activities remain a minor fraction (0.56%) of the examples, resulting in extreme class imbalance, which increases the difficulty of the detection problem.

Table 1 shows the details of the implementation and training of the various models compared. For objectivity in comparison with methods such as random forests or PCA, none of the neural network-based methods (FNN, CNN, LSTM, Autoencoders (RNN) parameter-tune any of the) were parameter-tuned. While this can lead to poor model parameterization, the goal was to explore the models' "out-of-the-box" performance ranking, as this is a better indicator of performance for detection of malicious behaviors (other than command and control).

TABLE 1

DESCRIPTION AND NUMBER OF FEATURES GENERATED BY THE COMPARED MODELS

| Method | #discovered features | #layers | Training algorithm |
| --- | --- | --- | --- |
| PCA + RF | 16 | — | — |
| RNN + RF | 8 | 3 (16-8-16) | Adam |
| FFNN | 16 | 3 (16-16-16) | Stochastic gradient descent |
| CNN | 16 | 2 (conv + pool) + 1 fully connected | Adam |
| LSTM | 16 | 1 layer with 100 LSTM cells | Adam |
| RNN + RF ext | 8 | 3 (16-8-16) | Adam |
| PCA + RF ext | 16 | — | — |

TABLE 1-continued

DESCRIPTION AND NUMBER OF FEATURES
GENERATED BY THE COMPARED MODELS

| Method | #discovered features | #layers | Training algorithm |
|---|---|---|---|
| FFNN + RF ext | 16 | 3 (16-16-16) | Stochastic gradient descent |
| CNN + RF ext | 16 | 2 (conv + poor) + 1 fully connected | Adam |
| LSTM + RF + int | 16 | 1 layer with 100 LSTM cells | Adam |

The proposed models with random forests were compared. (In time series classification, the considered data was composed of n examples, p features, and d days. To apply random forests, the data was flattened to obtain a feature matrix with n examples and p×d features. The resulting entity-feature matrix was suitable to train random forests.

TABLE 2 shows the AUROC and true positives in the top 100 of the compared methods when evaluated on unseen data.

TABLE 2

AUROC AND TRUE POSITIVES IN THE TOP 100 OF
THE COMPARED METHODS WHEN EVALUATED ON UNSEEN
DATA. DATA SETS ARE REPRESENTED BY THEIR
TIME SPAN (1, 7, 14, AND 28 DAYS).

| | AUROC | | | | True Positive in Top 100 | | | |
|---|---|---|---|---|---|---|---|---|
| Method | 1 day | 7 days | 14 days | 28 days | 1 day | 7 days | 14 days | 28 days |
| RF | 0.923 | 0.895 | 0.881 | 0.883 | 95 | 84 | 89 | 82 |
| PCA + RF | 0.928 | 0.83 | 0.816 | 0.867 | 86 | 66 | 68 | 74 |
| RNN + RF | 0.814 | 0.747 | 0.686 | 0.701 | 37 | 35 | 4 | 19 |
| FFNN | 0.906 | 0.84 | 0.829 | 0.869 | 7 | 0 | 0 | 0 |
| CNN | | 0.901 | 0.718 | 0.873 | | 0 | 1 | 4 |
| LSTM | | 0.898 | 0.877 | 0.869 | | 8 | 26 | 31 |
| PCA + $RF_{ext}$ | | 0.92 | 0.927 | 0.943 | | 89 | 92 | 87 |
| RNN + $RF_{ext}$ | | 0.747 | 0.678 | 0.756 | | 9 | 30 | 3 |
| FFNN + $RF_{ext}$ | | 0.929 | 0.888 | 0.912 | | 92 | 93 | 92 |
| CNN + $RF_{ext}$ | | 0.936 | 0.876 | 0.837 | | 95 | 89 | 74 |
| LSTM + RF + ext | | 0.904 | 0.914 | 0.923 | | 88 | 89 | 89 |

The first observation is that the AUROC achieved using 1 day of data reaches 0.923 and 0.928 for RF and PCA+RF. However, the performance of these two methods degrades with more days for training. This degradation is important since the length of the time window necessary to successfully detect malicious behaviors is unknown beforehand.

On average, the AUROC and TP in the Top 100 of the subset of the extended methods that try to complement human-engineered features (i.e. methods labeled with "ext") is higher than the complementary subset. By design, the methods CNN, LSTM, PCA+RF ext, RNN+RF ext, FFNN+RF ext, CNN+RF ext, and LSTM+RF ext require more than one day of data, therefore performance metrics for the one day case is not included. Additionally, it was observed that the performance of these methods does not degrade as the time spans increases. The best AUROC is achieved with the methods PCA+RF ext, using 28 days of data and CNN+RF ext, using 7 days of data. These models present an AUROC of 0.943 and 0.936, respectively, when evaluated on unseen data. This is marginally better than the 0.923 baseline AUROC obtained with a random forest classifier using one day of data. These results suggest that the information present in the last day's features is enough to accurately detect command and control communications. It is important to note that the performance of the methods using FFNN, CNN, LSTM, and RNN (autoencoders) can be improved via parameter tuning. In particular, the results show that RNN+RF (autoencoders) achieves the worst detection performance since it is unable either to detect attacks or discover new features. However, as stated above, one objective of the disclosed method is to evaluate and compare the "out-of-the-box" performance of the compared methods.

Figure 6A:
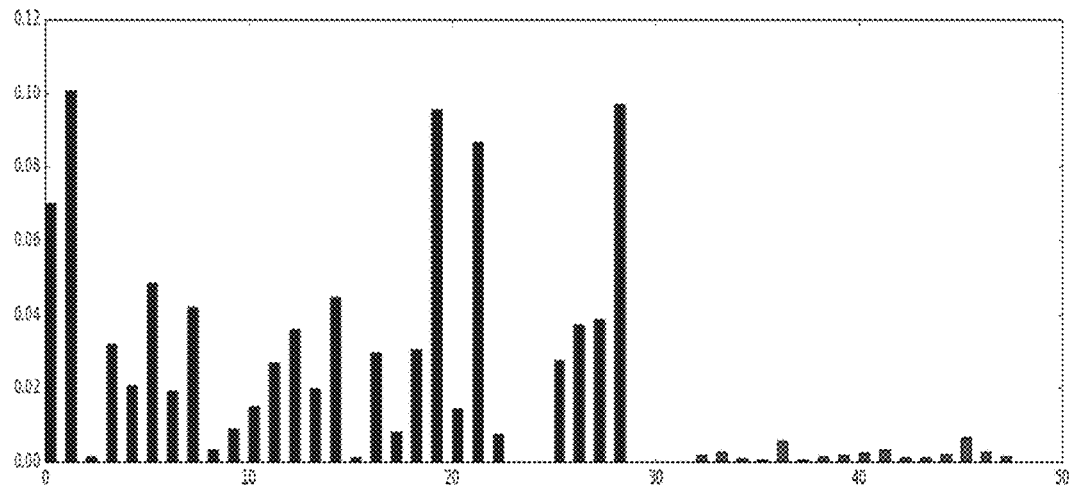
FIGS. 6A and 6B are graphs showing the feature importance of original historic features versus extracted features, for PCA and CNN based models, respectively.
Figure 6B:
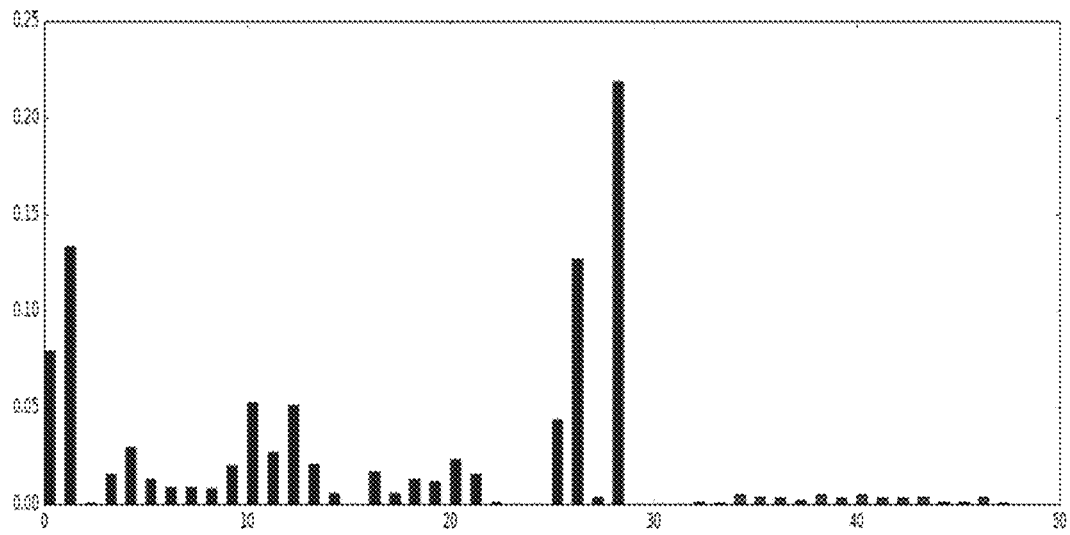

Regarding feature analysis, features discovered with the models PCA+RF ext using 28 days of data and CNN+RF ext using 7 days of data were analyzed. These models were chosen for analysis because they present the highest AUROC (0.943 and 0.936 when evaluated on unseen data). FIG. 6A presents the feature importance as determined by the random forest classifier of the 32 original features (left of the 30 day mark) versus the 16 features extracted with PCA from the previous 27 days of data (right of the 30 day mark). In the same way, FIG. 6B shows the feature importance of the 32 original features (left) and the 16 features learned with the CNN model from the previous 6 days. The FIGUREs show that the discovered features are used by the classifier, and indicates that their importance is low. This observation confirms that, for malware communication detection, analyzing historic data only provides marginal benefits.

While the disclosed method has been described with respect to cybersecurity applications, the disclosed method may have application in a wide variety of technical fields where log data is generated, such as industrial engineering processes, including operations research, systems engineering, manufacturing engineering, production engineering, management science, management engineering, safety engineering, manufacturing systems, etc. for various industries, (e.g. aerospace, automotive, electrical, construction, foods and other consumer goods, mail and package delivery, etc.), according to various embodiments.

The methods, systems, process flows and logic of disclosed subject matter associated with a computer readable medium may be described in the general context of computer-executable instructions, such as, for example, program modules, which may be executed by a computer. Generally, program modules may include routines, programs, objects, components, data structures, etc. that perform particular tasks or implement particular abstract data types. The disclosed subject matter may also be practiced in distributed computing environments wherein tasks are performed by remote processing devices that are linked through a communications network. In a distributed computing environment, program modules may be located in local and/or remote computer storage media including memory storage devices.

The detailed description set forth herein in connection with the appended drawings is intended as a description of exemplary embodiments in which the presently disclosed subject matter may be practiced. The term "exemplary" used throughout this description means "serving as an example, instance, or illustration," and should not necessarily be construed as preferred or advantageous over other embodiments.

This detailed description of illustrative embodiments includes specific details for providing a thorough understanding of the presently disclosed subject matter. However, it will be apparent to those skilled in the art that the presently disclosed subject matter may be practiced without these specific details. In some instances, well-known structures and devices are shown in block diagram form in order to avoid obscuring the concepts of the presently disclosed method and system.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein, but is to be accorded the widest scope consistent with the principles and novel features disclosed herein. It is contemplated that additional embodiments are within the spirit and true scope of the disclosed subject matter.

We claim:

1. A cybersecurity method comprising:
   forming a time based series of behavioral features comprising human engineered features by extracting at least one behavioral feature from a first set of log data retrieved over a first time segment, and extracting at least one behavioral feature from a second set of log data retrieved over a second time segment;
   analyzing the time based series of behavioral features,
   wherein said analyzing the time based series of behavioral features comprises using a neural network based system, a dimensionality reduction system, random forest system, or combinations thereof,
   deriving machine learned features from said time based series of behavioral features through said analyzing the time based series of behavioral features; and
   detecting an attack or threat to an enterprise or e-commerce system through said analyzing the time based series of behavioral features,
   wherein said detecting an attack or threat comprises determining behavioral patterns indicative of said attack or threat based on the combination of said human engineered features and said machine learned features,
   wherein the time based series of behavioral features is formatted into a time-based matrix, wherein each behavioral feature is associated with an entity and a time segment.

2. The method of claim 1, wherein the time-based series of behavioral features is further analyzed for features evaluation.

3. The method of claim 1, wherein each of the at least one the behavioral feature is extracted by activity tracking, activity aggregation, or a combination thereof.

4. The method of claim 1, wherein said analyzing the time based series of behavioral features comprises applying a first method, comprising at least one of a Feed-Forward Neural Network (FFNN), a Convolutional Neural Network (CNN), Long Short-Term Memory (LSTM), Principal Component Analysis (PCA), Recurrent Neural Network (RNN), in combination with a second method, comprising Random Forest (RF).

5. The method of claim 1, wherein said analyzing the time based series of behavioral features comprises applying a method based on a Feed-Forward Neural Network (FFNN), a Convolutional Neural Network (CNN), a Recurrent Neural Network (RNN), Long Short-Term Memory (LSTM) network, principal Component Analysis (PCA), a Random Forest pipeline, an autoencoder, or combinations thereof.

6. The method of claim 1, wherein said machine learned features are derived from said human engineered features.

7. The method of claim 1, wherein said forming a time based series of behavioral features comprises extracting behavioral features from at least three time intervals.

8. An apparatus for learning representations of log data for cyber security, the apparatus comprising:
   one or more processors;
   a system memory coupled to the one or more processors;
   one or more non-transitory memory units coupled to the one or more processors; and
   features extraction codes, features formatting codes, and data analysis codes stored on the one or more non transitory memory units, that when executed by the one or more processors, are configured to perform a method, comprising:
   forming a time based series of behavioral features for multiple entities by extracting behavioral features from log data retrieved over a first time segment, and extracting behavioral features from log data retrieved over a second time segment, wherein said time based series of behavioral features comprises human engineered features associated with said multiple entities; and
   analyzing the time based series of behavioral features,
   wherein said analyzing the time based series of behavioral features comprises using a neural network based system, a dimensionality reduction system, random forest system, or combinations thereof,
   deriving machine learned features from said time based series of behavioral features through said analyzing the time based series of behavioral features; and
   detecting an attack or potential threat to the enterprise or e-commerce system through said analyzing the time based series of behavioral features,
   wherein said detecting an attack or potential threat comprises determining behavioral patterns indicative of said attack or potential threat based on the combination of said human engineered features and said machine learned features,
   wherein the features extraction codes are configured to extract the behavioral features by executing an activity tracking module, an activity aggregation module, or a combination thereof,
   wherein the time based series of behavioral features is formatted into a time based features matrix by formatting and storing the at least one or more features into the time based features matrix, wherein each feature is associated an entity and time segment.

9. The apparatus of claim 8, wherein the time-based series of behavioral features is further analyzed for features evaluation.

10. The apparatus of claim 8, further comprising feeding data comprising log lines into the apparatus through a network interface to the one or more non-transitory memory units.

11. The apparatus of claim 8, wherein each of the at least one behavioral feature is associated with a unique entity.

12. The apparatus of claim 8, wherein the data analysis codes are configured to analyze the time based series of behavioral features by a Feed-Forward Neural Network (FFNN), a Convolutional Neural Network (CNN), a Recurrent Neural Network (RNN), Long Short-Term Memory (LSTM) network, principal Component Analysis (PCA), a Random Forest pipeline, an autoencoder, or combinations thereof.

13. The apparatus of claim 8, wherein said machined learned features are derived from said human engineered features.

14. A cybersecurity method comprising:
  extracting at least one behavioral feature from a first set of log data retrieved over a first time segment, and extracting at least one behavioral feature from a second set of log data retrieved over a second time segment;
  computing, for multiple entities and over multiple time segments, one or more features from the log lines by activity tracking, activity aggregation, or a combination thereof;
  storing the one or more features in a time based series of behavioral features matrix, wherein for each of said entities, a set of features is stored on a per time-segment basis;
  analyzing the time-based series of behavioral features matrix using a neural network based system, a dimensionality reduction system, random forest system, or combinations thereof;
  deriving machine learned features from said time based series of behavioral features matrix via said analyzing;
  detecting a malicious entity by determining behavioral patterns indicative of a malicious status related to said malicious entity based on the combination of the derived machine learned features and said one or more features computed from said log lines.

15. The method of claim 14, wherein the machine learned features are derived using a method comprising at least one of a Feed-Forward Neural Network (FFNN), a Convolutional Neural Network (CNN), Long Short-Term Memory (LSTM), Principal Component Analysis (PCA), and Recurrent Neural Network (RNN).

16. The method of claim 15, further comprising using a random forest classifier for feature evaluation.

17. The method of claim 14, comprising computing said one or more features over at least three time segments.

* * * * *